(12) United States Patent
Balacheff et al.

(10) Patent No.: US 9,053,323 B2
(45) Date of Patent: Jun. 9, 2015

(54) TRUSTED COMPONENT UPDATE SYSTEM AND METHOD

(75) Inventors: Boris Balacheff, Bristol (GB);
Valiuddin Y. Ali, Cypress, TX (US);
Lan Wang, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1468 days.

(21) Appl. No.: 11/786,874

(22) Filed: Apr. 13, 2007

(65) Prior Publication Data
US 2008/0256363 A1 Oct. 16, 2008

(51) Int. Cl.
G06F 11/30 (2006.01)
G06F 21/57 (2013.01)

(52) U.S. Cl.
CPC .................................. G06F 21/572 (2013.01)

(58) Field of Classification Search
CPC ................................................. G06F 21/572
USPC ............ 713/187, 1, 2, 181, 191, 193; 726/22; 714/36, 38, 719; 717/168
See application file for complete search history.

(56) References Cited

U.S. PATENT DOCUMENTS

| | | | | |
|---|---|---|---|---|
| 5,421,006 A | * | 5/1995 | Jablon et al. | 714/36 |
| 5,778,070 A | * | 7/1998 | Mattison | 713/191 |
| 5,850,559 A | * | 12/1998 | Angelo et al. | 713/320 |
| 5,859,911 A | * | 1/1999 | Angelo et al. | 713/187 |
| 5,883,956 A | * | 3/1999 | Le et al. | 713/170 |
| 5,944,821 A | * | 8/1999 | Angelo | 726/22 |
| 6,581,159 B1 | * | 6/2003 | Nevis et al. | 713/2 |
| 6,587,947 B1 | | 7/2003 | O'Donnell et al. | |
| 6,732,306 B2 | * | 5/2004 | Dover et al. | 714/719 |
| 2004/0052190 A1 | * | 3/2004 | Sako et al. | 369/59.24 |
| 2005/0079868 A1 | | 4/2005 | Shankar et al. | |
| 2006/0080546 A1 | * | 4/2006 | Brannon et al. | 713/185 |
| 2006/0101310 A1 | | 5/2006 | Diamant et al. | |

FOREIGN PATENT DOCUMENTS

| | | |
|---|---|---|
| JP | 2006-221354 | 8/2006 |
| KR | 10-2003-0075018 A | 9/2003 |
| KR | 10-2004-0068606 A | 7/2004 |
| WO | 2006-055124 A2 | 5/2006 |
| WO | WO-2006/055424 | 5/2006 |
| WO | WO2006055424 | 5/2006 |

OTHER PUBLICATIONS

PCT International Search Report and Written Opinion of the International Searching Authority having a date of mailing of Jul. 24, 2008 in co-pending PCT International Patent Application No. PCT/US2008/003188, having an International Filing Date of Mar. 7, 2008 and an applicant of Hewlett-Packard Development Company, L.P. et al and entitled Trusted Component Update System and Method.
European Search Report dated May 31, 2010, pp. 6.

(Continued)

*Primary Examiner* — Samson Lemma
(74) *Attorney, Agent, or Firm* — Dicke, Billig & Czaja, PLLC

(57) ABSTRACT

A trusted component update system comprises verify logic configured to validate integrity of an update to a trusted component of a computing device, and logic disposed in the trusted component and configured to validate integrity of the verify logic.

17 Claims, 2 Drawing Sheets

(56) References Cited

OTHER PUBLICATIONS

European Patent Office, Communication pursuant to Article 94(3) EPC, Appln No. 08726684.7, date of mailing Mar. 25, 2011, pp. 5.
JP Notice of Rejection, Appln No. P2010-503002, date of mailing Jan. 5, 2012, 3 p.
Translation of JP Notice of Rejection, Appln No. P2010-503002, date of mailing Jan. 5, 2012, 3 p.
European Patent Office, Communication pursuant to Article 94(3) EPC, Appln No. 08726684.7, date of mailing Mar. 5, 2012, 7 p.

* cited by examiner

TRUSTED COMPONENT UPDATE SYSTEM AND METHOD

BACKGROUND

Computer manufacturers generally need a way to update the contents of a trusted component, such as a basic input/output system (BIOS) flash memory, to fix bugs and/or provide new capabilities. However, enabling the BIOS flash memory or other trusted component to be modified renders the trusted component susceptible to corruption by malicious or unauthorized logic.

BRIEF DESCRIPTION OF THE DRAWINGS

For a more complete understanding of the present application, the objects and advantages thereof, reference is now made to the following descriptions taken in conjunction with the accompanying drawings, in which.

DETAILED DESCRIPTION OF THE DRAWINGS

Figure 1:
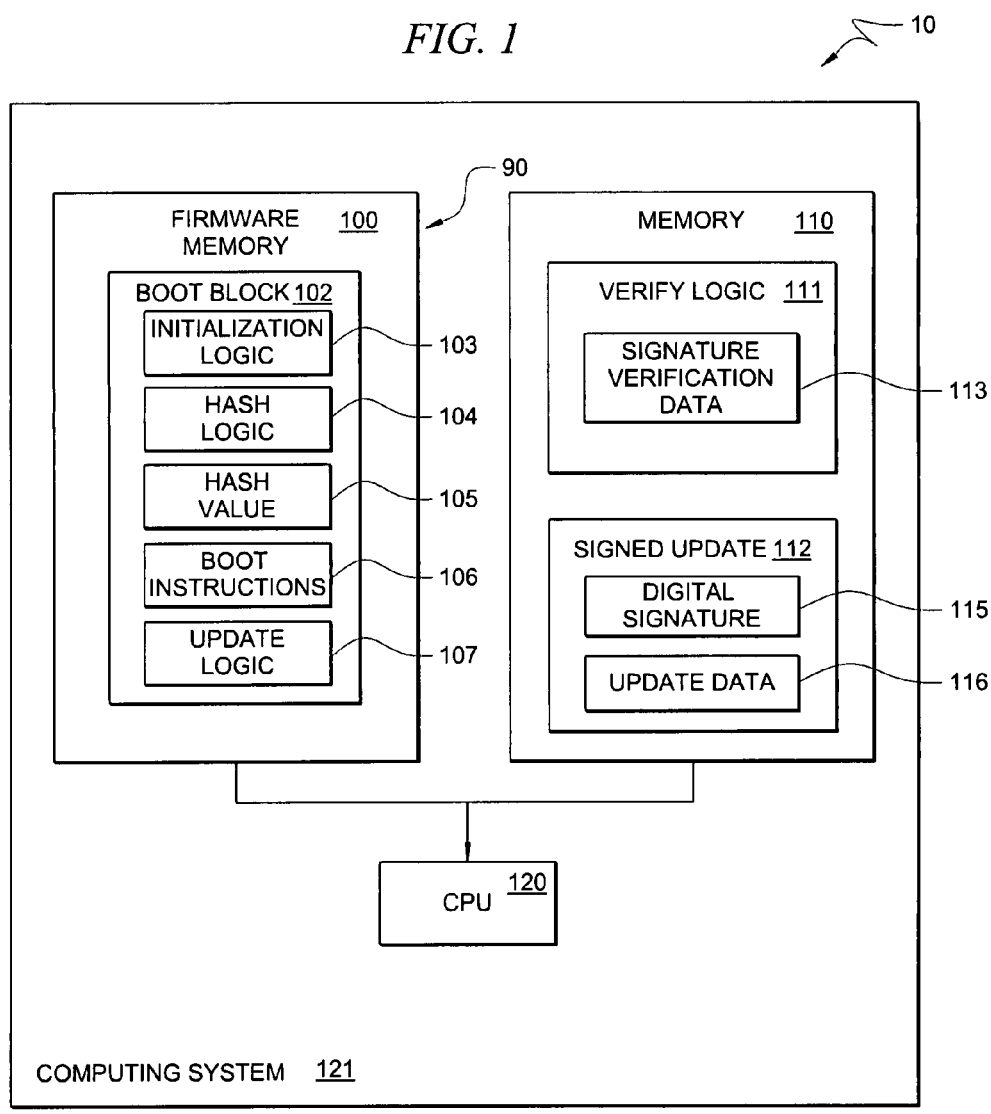
FIG. 1 is a diagram illustrating an embodiment of a trusted component update system.

FIG. 1 is a diagram illustrating an embodiment of a trusted component update system 10. Update system 10 enables a trusted component to verify that a proposed update to the trusted component is provided by a source that has been previously identified as a trusted source and that the proposed trusted component update has not been tampered with. In the embodiment illustrated in FIG. 1, update system 10 comprises a computing system 121 having a trusted component 90, a central processing unit (CPU) 120 and system memory 110. In FIG. 1, trusted component 90 comprises a firmware memory 100 such as firmware flash memory. Computing system 121 may comprise a notebook computer, a desktop computer, a server, a gaming device, an audio device, a video device, or any type of device comprising a trusted component. In FIG. 1, firmware memory 100 provides boot-up functions for computing system 121 when computing system 121 is first powered on, restarted and/or reset. For example, firmware memory 100 may initialize the configuration of CPU 120 prior to a time when CPU 120 begins executing instructions, such as by enabling and/or disabling certain capabilities of CPU 120 and setting a clock rate in CPU 120.

In the embodiment illustrated in FIG. 1, computing system 121 comprises two sections of memory that are separated by "trust" and generally reside in separately manufactured components. For example, in some embodiments, firmware memory 100 is a flash memory comprising a trusted memory boot block 102 (e.g., for providing boot-up functions for computing system 121 when computing system 121 is first powered on, restarted and/or reset), whereas memory 110 might not comprise trusted memory and/or may comprise a non-firmware memory. However, it should be understood that a trusted memory may also reside in a location other than firmware memory 100. As used herein, "trust" or "trusted" means the expectation of consistent operation within a pre-defined set of rules that is enforced by computing hardware and/or software, such as the definition of "trust" as set forth in the *TCG Specification Architecture Overview Specification, Revision* 1.2 (Trusted Computing Group, 2004). For example, ensuring that the contents of a certain section of memory in computing system 121, such as boot block 102 of firmware memory 100, contains only information produced by a pre-viously-identified source, defined as a trusted source, enables the trust of that certain section of system component.

Firmware memory 100 is coupled to CPU 120 for performing boot-up operations and memory 110 for reading data used by firmware memory 100. In the embodiment illustrated in FIG. 1, firmware memory 100 comprises non-volatile, flash memory. In some embodiments, firmware memory 100 comprises a basic input/output system (BIOS). In some embodiments, firmware memory 100 comprises an Extensible Firmware Interface (EFI) or a Uniform EFI (UEFI). However, it should be understood that firmware memory 100 may comprise any system providing boot-up functionality for a computing system. Memory 110 may comprise volatile memory, non-volatile memory and permanent storage, such as a digital media drive (DMD). In the embodiment illustrated in FIG. 1, computing system 121 is shown as comprising a single CPU 120, although it should be understood that a greater quantity of CPUs may be used.

In the embodiment illustrated in FIG. 1, firmware memory 100 comprises boot block 102. Boot block 102 is generally the initial logic executed in firmware memory 100 when computing system 121 is first powered on, restarted and/or reset. Boot block 102 is a trusted logic because boot block 102 is locked within firmware memory 100 and is protected from updating during normal computing system 121 operation (i.e., boot block 102 is updated by trusted methods from a trusted source which can be validated, for example, by cryptographic methods).

Trusted systems and trusted methods are systems and methods having a sufficient level of security to prevent unauthorized changes to the contents of the trusted memory. For example, trusted systems and trusted methods may use strong security methods, such as cryptographic algorithms including RSA Verify, Elliptic Curve Cryptography (ECC), Digital Signature Algorithm (DSA), the Secure Hash Algorithm 1 (SHA-1) and SHA-2 to ensure that a trusted source produced a certain digital file and/or that the digital file has not been changed or tampered with since the trusted source produced it. Trusted systems and trusted methods ensure that the digital file can be trusted prior to using the digital file to modify trusted memory. In this manner, logic that is unauthorized by the trusted source, as well as viruses, can be kept out of trusted memory, even though the trusted memory is modifiable.

In the embodiment illustrated in FIG. 1, boot block 102 comprises initialization logic 103, hash logic 104, a hash value 105, boot instructions 106 and update logic 107. Initialization logic 103 comprises logic, data and instructions that are processed and/or executed within boot block 102 of firmware memory 100. Generally, when firmware memory 100 completes processing the instructions found in and/or referenced by boot block 102, firmware memory 100 may perform any other boot-up procedures prior to transferring control of computing system 121 to an operating system. Update logic 107 comprises executable instructions for overwriting sections of firmware memory 100, such as boot block 102.

Hash logic 104 is executed to verify the integrity of a digital file by performing a hash function, which is a mathematical operation producing a hash value as a result. In some embodiments, hash logic 104 comprises the SHA-1 algorithm, although other hash functions may be used alternatively or in addition. Hash value 105 is a previously computed integrity validation value, which is a number used for validating that a digital file (e.g., an executable computer program) has not been tampered with. In operation, hash logic 104 is executed on a digital file in order to calculate a hash value which is compared to a hash value 105 stored in firmware memory 100. Thus, if the calculated hash value corresponds to and/or otherwise matches hash value 105, the digital file is considered trustworthy. Hash logic 104 and hash value 105 are stored in boot block 102, which resides in firmware memory 100. In some embodiments, hash logic 104 and hash value 105 are initially placed in boot block 102 when computing system 121 is manufactured, refurbished, updated or repaired. Thus, update system 10 is able to extend trust from boot block 102 to digital files stored outside of firmware memory 100, thereby creating a chain of trust.

In the embodiment illustrated in FIG. 1, memory 110 comprises verify logic 111 and a signed update 112. Signed update 112 comprises an update for trusted component 90, such as an update for boot block 102, proposed by a trusted party, such as the manufacturer of computing system 121. For example, signed update 112 may comprise a bug fix represented in an update data 116. Verify logic 111 comprises logic, instructions and data, including signature verification data 113, to verify that signed update 112 was produced by a trusted source, such as the manufacturer of computing system 121 or a computer network administrator, and further that signed update 112 has not been tampered with since being produced. Hash logic 104 and verify logic 111 each comprise means for trust verification. However, verify logic 111 may be trusted, even though stored outside trusted firmware memory 100, because hash logic 104 enables firmware memory 100 to extend trust from firmware memory 100 to verify logic 111. Signature verification data 113 is used for integrity verification (e.g. ensuring no tampering) and origin verification (e.g. ensuring the previously-identified trusted source is the producer) by enabling verify logic 111 to independently calculate certain portions of a digital signature 115 in signed update 112. In the embodiment illustrated in FIG. 1, verify logic 111 is disposed in and/or may be executed from system memory 110. However, it should be understood that in some embodiments, verify logic 110 may reside is and be executed from firmware memory 100.

In some embodiments, digital signature 115 comprises an alphanumeric sequence attached to signed update 112 by the author of signed update 112, which uniquely identifies the author and also provides a basis for ensuring file integrity with a hash algorithm. Signature verification data 113 is data used by verify logic 111 to perform independent calculations using digital signature 115 and other portions of signed update 112. For example, in some embodiments, signature verification data 113 comprises a hash of update data 116 signed and/or encrypted by a private key of the trusted party. Verify logic 111 hashes at least a portion of signed update 112, for example update data 116, decrypts digital signature 115, and determines whether the hash of update data 116 corresponds to the decrypted digital signature 115. If the two values correspond, signed update 112 is considered to be a verified replication of a file authored by the trusted party that has not been tampered with since being produced. In some embodiments, verify logic 111 comprises RSA Verify, which is an algorithm suitable for digital signature verification.

Update data 116 comprises information to be used for modifying the contents of firmware memory 100, such as the contents of boot block 102, hash logic 104, hash value 105 and boot instructions 106. In some embodiments, signed update 112 may further or alternatively comprise modification information for verify logic 111. In some embodiments, signed update 112 comprises an executable patch program capable of modifying the contents of boot block 102 without using update logic 107.

In some embodiments of operation of update system 10, a manufacturer of computing system 121 or other entity generates verify logic 111 with signature verification data 113 that uniquely identifies the entity as a trusted source for future updates to firmware memory 100. The entity hashes all or a portion of verify logic 111 with a duplicate of hash logic 104 to calculate hash value 105. Hash logic 104, hash value 105 and boot instructions 106 are stored boot block 102 within firmware memory 100, and verify logic 111 is stored in memory 110. In some embodiments, each time computing system 121 boots up, boot instructions 106 search for an indication that an update, such as signed update 112, is available and/or waiting (e.g., waiting in memory 110, a hard disk or other storage medium) to be used to modify the contents of firmware memory 100. For example, during a previous use of computing system 121, the entity may have sent an electronic message over a computer network placing signed update 112 in memory 110.

If signed update 112 is found, hash logic 104 validates the integrity of verify logic 111 by hashing all or a portion of verify logic 111 and comparing the result of the hashing with hash value 105 to ensure that verify logic 111 has not been tampered with. If verify logic 111 is valid (i.e., it is considered to not have been tampered with based on the hash value of verify logic 111 corresponding to hash value 105), boot block 102 causes execution of verify logic 111 to verify the authorship of digital signature 115 using signature verification data 113. For example, in some embodiments, verify logic 111 is used to verify a digital signature file (e.g., digital signature 115) associated with signed update 112 by using a cryptographic method such as the RSA digital signature verification algorithm. Thus, in some embodiments, digital signature 115 represents a pre-calculated hash value of at least a portion of update data 116 that has been encrypted by a private key of a trusted party. In operation, verify logic 111 decrypts digital signature 115 (e.g., using signature verification data 113, such as a paired public key to the trusted party's private key), hashes a corresponding portion of update data 116, and compares the calculated hash value to the decrypted digital signature 115. If the verification of digital signature 115 is successful, boot block 102 executes update logic 107 to modify the contents of firmware memory 100, such as boot block 102, using update data 116. Thus, embodiments of system 10 enable a manufacturer or other trusted entity to fix bugs and/or otherwise modify firmware memory 100 while minimizing the risk of unauthorized or malicious changes to firmware memory 100 by an unauthorized entity.

Figure 2:
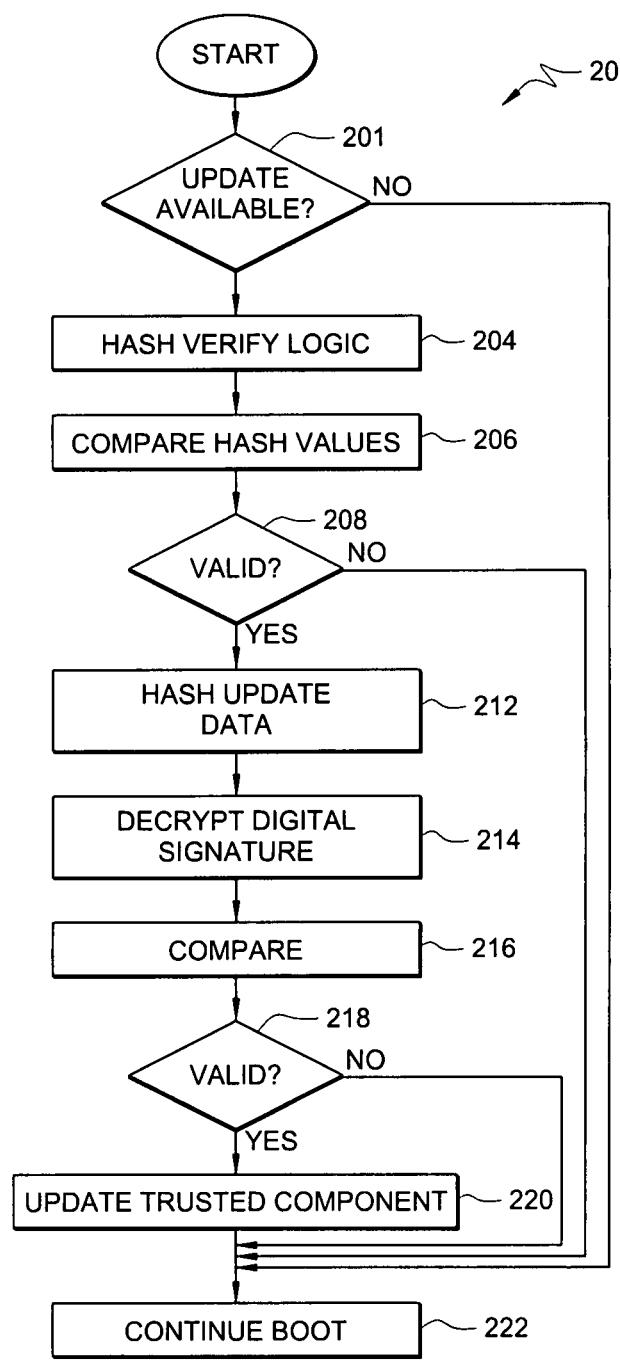
FIG. 2 is a diagram illustrating an embodiment of a trusted component update method.

FIG. 2 is a diagram illustrating an embodiment of a trusted firmware memory update method 200. Method 200 is described with reference to update system 10 of FIG. 1, although it should be understood that method 200 may be used with alternative embodiments.

At block 201, boot block 102 determines whether signed update 112 is present (e.g., present in memory 110 or elsewhere). If no signed update 112 is present, the method proceeds to block 222, where boot block 102 continues to boot computing system 121. If signed update 112 is available or present, boot block 102, hash logic 104 hashes verify logic 111 to produce a newly calculated hash value at block 204. At block 206, the newly calculated hash value is compared with hash value 105 stored in firmware memory 100 to determine the validity of verify logic 111. If, at decision block 208, the newly calculated hash value does not correspond to hash value 105, trusted component 90 will not be updated with such update, and boot block 102 instead continues to boot computing system 121 at block 222. If, at decision block 208, the newly calculated hash value corresponds to hash value 105, the method proceeds to block 212.

At block 212, verify logic 111 is executed and used to verify the digital signature of signed update 112 by hashing update data 116. At block 214, verify logic 111 decrypts digital signature 115 using signature verification data 113 and compares the hash of update data 116 with the decrypted digital signature 115 at block 216. If, at decision block 218, the hash of update data 116 does not correspond to decrypted digital signature 115, the digital signature of signed update 112 is not verified, and such update will not be loaded, installed or implemented, but instead boot block 102 continues to boot computing system 121 at block 222. If, at decision block 218, the hash of update data 116 does match the decrypted digital signature 115, the digital signature of signed update 112 is considered verified valid, and trusted component 90 is updated with update data 116 by executing update logic 107 at block 220. Boot block 102 continues to boot computing system 121 at block 222.

Thus, embodiments of update system 10 enable field updates to be made to trusted memory. It should be understood that in the described method, certain functions may be omitted, accomplished in a sequence different from that depicted in FIG. 2, or performed simultaneously. Also, it should be understood that the method depicted in FIG. 2 may be altered to encompass any of the other features or aspects as described elsewhere in the specification. Further, embodiments may be implemented in software and can be adapted to run on different platforms and operating systems. In particular, functions implemented by logic 104, logic 111, and logic 107, for example, may be provided as an ordered listing of executable instructions that can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this document, a "computer-readable medium" can be any means that can contain, store, communicate, propagate or transport the program for use by or in connection with the instruction execution system, apparatus, or device. The computer-readable medium can be, for example, but is not limited to, an electronic, magnetic, optical, electro-magnetic, infrared, or semi-conductor system, apparatus, device, or propagation medium.

What is claimed is:

1. A trusted component update system, comprising:
   a computing device comprising a hardware processing unit;
   verify logic stored in memory of the computing device and executed by the processing unit to validate integrity of an update to a trusted component of the computing device, the update to modify content of the trusted component; and
   logic stored in a boot block of trusted memory of the trusted component and executed by the processing unit to validate integrity of the verify logic before the verify logic validates the integrity of the update,
   wherein the update to the trusted component comprises an update to the boot block of trusted memory of the trusted component, wherein the boot block provides boot-up functionality to the computing device.

2. The system of claim 1, wherein the logic in the trusted component is configured to hash at least a portion of the verify logic and compare the hash of the verify logic with a predetermined hash value stored in the boot block of trusted memory of the trusted component to validate the integrity of the verify logic.

3. The system of claim 1, wherein the verify logic is configured to validate integrity of a signature associated with the update.

4. The system of claim 1, wherein the verify logic is configured to hash at least a portion of the update and compare the hash of the update to a decrypted digital signature signed by a trusted party to validate the integrity of the update.

5. The system of claim 1, wherein the boot block of the trusted component is configured to determine availability of the update upon booting of the computing device.

6. The system of claim 1, wherein the trusted component comprises a firmware flash memory.

7. A trusted component update method, comprising:
   validating, by a hardware processing unit of a computing device, integrity of an update to a trusted component of the computing device using verify logic stored in memory of the computing device, the update to change existing contents of the trusted component; and
   before the validating of the integrity of the update, validating, by the processing unit of the computing device, integrity of the verify logic using logic stored in a boot block of trusted memory of the trusted component,
   wherein the update to the trusted component comprises an update to the boot block of trusted memory of the trusted component, wherein the boot block provides boot-up functionality to the computing device.

8. The method of claim 7, wherein validating the integrity of the update comprises validating integrity of a signature associated with the update.

9. The method of claim 7, wherein validating the integrity of the verify logic comprises hashing at least a portion of the verify logic and comparing the hash of the verify logic with a predetermined hash value stored in the boot block of trusted memory of the trusted component.

10. The method of claim 7, wherein validating the integrity of the update comprises hashing at least a portion of the update and comparing the hash of the update to a decrypted digital signature signed by a trusted party.

11. The method of claim 7, further comprising determining, by the boot block of the trusted component, availability of the update upon booting of the computing device.

12. The system of claim 1, wherein the memory of the computing device comprises non-trusted system memory of the computing device.

13. The system of claim 1, wherein the boot block of trusted memory resides in firmware memory of the trusted component.

14. The system of claim 1, wherein the logic executed by the processing unit to validate integrity of the verify logic is stored in the boot block of trusted memory of the trusted component before the update is available.

15. The system of claim 1, further comprising:
   boot instructions stored in the boot block of trusted memory of the trusted component.

16. The method of claim 7, wherein the memory of the computing device comprises non-trusted system memory of the computing device.

17. The method of claim 7, wherein the boot block of trusted memory resides in firmware memory of the trusted component.

* * * * *